March 12, 1957 E. L. C. WHITE 2,785,222

CIRCUITS FOR THE RE-INSERTION OF THE DIRECT CURRENT COMPONENT IN ELECTRIC SIGNALS

Filed Feb. 15, 1951

Inventor
ERIC LAWRENCE CASLING WHITE
By Ralph E. Atherton
Attorney

United States Patent Office 2,785,222
Patented Mar. 12, 1957

2,785,222

CIRCUITS FOR THE RE-INSERTION OF THE DIRECT CURRENT COMPONENT IN ELECTRIC SIGNALS

Eric Lawrence Casling White, Iver, England, assignor to Electric & Musical Industries Limited, Hayes, England, a company of Great Britain Application February 15, 1951, Serial No. 211,034
Claims priority, application Great Britain February 25, 1950
3 Claims. (Cl. 178—7.1)

Figures 1, 2, 3, 4, 5, 6, 7:
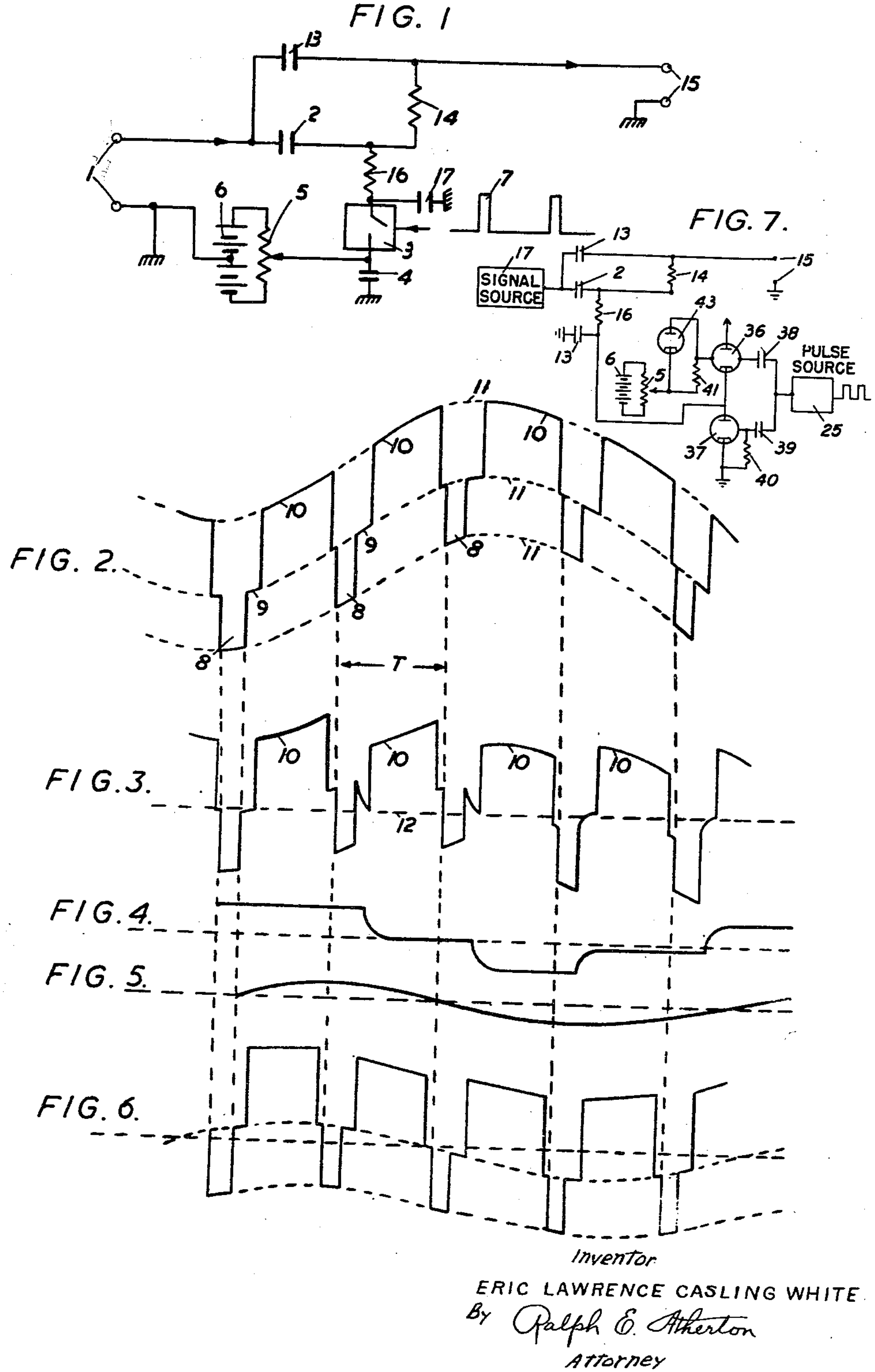

This invention relates to circuits for setting the level of electric signals which contain recurrent datum signals which should have a fixed level.

It is well-known that in electric signalling systems, such as television systems and pulse transmitting systems, the so called D. C. component of the signal which includes low frequency components, frequently becomes lost as a result of transmitting the signal through a circuit element which cannot transmit the D. C. component with the consequence that the level of the signals varies. Various circuit arrangements have been proposed and employed for the purpose of re-inserting the lost D. C. component. One such circuit comprises a rectifier which is arranged to rectify datum level signals, such as synchronising signals, which should have a fixed level if the D. C. component were present, the rectifier serving to produce a correcting signal which is added to the signals so as to restore the datum level signals to approximately a fixed value. During the intervals between the datum level signals the correcting signal leaks away through a leak resistance, so that the diode is again able to rectify the next datum level signal and to produce a correcting signal on the level of that particular signal. In some types of the television pick-up tubes such as cathode potential stabilised tubes it has been proposed to employ a metallic mesh electrode close to the target electrode, but when employing such electrodes it is found that interference components are generated by the pick-up tube and become superimposed on the picture signals, such interference components being of a sinusoidal character and arising due to microphony of the mesh electrode. Similar interference may also arise due to microphonic valves or due to incidental pick-up of supply mains frequency, or harmonics thereof. In operation of a D. C. re-inserting circuit as above described, if the signals have super-imposed thereon interference signals of large amplitudes and of frequencies which, while definitely less than the repetition frequency of the datum level signals, nevertheless approach this frequency or if the D. C. level of the signals should wander at such a frequency, then although the datum level signals are restored by the action of the rectifier to a substantially fixed level, the signals which occur between successive datum signals are left with an undesired component of large magnitude due to the interferring signal, or to the wander of the D. C. component. Moreover, due to leakage of the correcting signal such may even itself introduce an undesired component.

Another type of D. C. re-inserting circuit is described in the United States Patent No. 2,190,753, the method described in this patent being frequently referred to as "clamp D. C. re-insertion." In this type of circuit a correcting signal is produced by the use of either a uni-directionally or a bi-directionally conducting switch which is switched into operation on the occurrence of each datum level signal so that each datum signal is brought to a fixed and constant level as determined by a source of constant potential. With this type of circuit an undesired component, due to interrference present in the original signals or due to excessive wander of the D. C. level, is also left in the signals between the datum portions in the manner above described. In the case where a uni-directionally conducting switch is employed this undesired component is present together with an undesired distortion component due to leakage of the correcting signal which occurs during the intervals between the datum signals. This latter component is, however, absent in the case where a bi-directionally conducting switch is employed.

The object of the present invention is to provide an improved circuit for setting the level of electric signals which also serves to remove or reduce undesired components which would otherwise be present in the signal as above referred to.

In order that the said invention may be clearly understood and readily carried into effect, it will now be more fully described with reference to the accompanying drawings, in which:

Figure 1 illustrates diagrammatically a circuit according to the preferred form of the invention, Figures 2, 3, 4, 5 and 6 illustrate various waveforms explanatory of the invention, and Figure 7 illustrates a circuit according to the invention embodying a switch as described in the aforesaid United States patent.

The circuit shown in Figure 1 comprises level setting means which includes a clamp D. C. re-inserting circuit and the operation of this circuit will be described as applied by way of example to the re-insertion of lost D. C. components in television signals which have superimposed interference of a sinusoidal character which may arise due to microphonic effects in a television pick-up tube as referred to above. The signals are applied to input terminals 1 and are fed through a condenser 2 to a bi-directionally-conducting switch 3 in series therewith and which is connected to earth through a condenser 4 and is also connected to a tapping point on a potentiometer 5 connected across a source of D. C. potential 6. The condenser 2 and switch 3 are thus in shunt across the source of signals at the input terminals 1. A suitable bidirectionally conducting switch is disclosed in the above patent. The switch 3 is rendered periodically conducting by applying thereto pulses indicated at 7 so that the switch is periodically closed and at the instants when the switch is closed the signals are brought to a predetermined potential depending on the position of the tapping point on the potentiometer 5. This circuit is, as stated above, a clamp D. C. re-inserting circuit in accordance with the specification of the above-numbered patent. The signals applied to the input terminals 1 may be of the form shown in Figure 2 comprising a series of line synchronising signals 8, datum portions 9 which should have a constant amplitude if the D. C. component of the signals had not been lost and if no interfering signal were super-imposed, and picture signals 10 which for the purpose of illustration are assumed to be of peak-white level. It will be observed from Figure 2 that since the D. C. component has been lost the portions 9 are no longer at a fixed level but vary in amplitude and, furthermore, an interference of a sinusoidal character is super-imposed on the waveform as indicated by the dotted lines 11. In operation of the clamp D. C. re-inserting circuit so far described in connection with Figure 1 the switch 3 is operated each time a datum level signal 9 is present and serves to re-insert the lost D. C. component so that each of the datum portions 9 is stabilised at a fixed potential. The output waveform which would be derived from the condenser 2 and earth would then appear as shown in Figure 3 of the drawings from which it will be observed that the portions 9 are brought to a fixed level indicated by the dotted line 12 so that the left-hand end of each of the picture signal portions 10 has the interference removed, but a residue of interference remains as indicated by the sloping portions of the picture signals 10. A limit is therefore set to the amount of attenuation of interference which can be achieved by a clamp D. C. re-inserting circuit. The attenuation factor $k$ at the right-hand end of each line of the picture signals 10 is inversely proportional to the frequency $f$ of the interference (which as will be observed from Figure 2 is of a frequency considerably lower than that of the line frequency synchronising pulses 8) and to the period T of the pulses 8 and may be shown to be $$k=\frac{1}{2\pi fT}$$

In accordance with the invention the clamp D. C. re-inserting circuit is associated with a smoothing circuit comprising a condenser 13 and a resistance 14 arranged in series across the condenser 2 and an output is taken from output terminals 15. The condenser 13 is small compared with the condenser 2 and the time constant of the condenser 13 and resistance 14 is of the order of the period T of the pulses 8. With this circuit there is set up across the condenser 2 the waveform shown in Figure 4 which is substantially the difference between the waveform shown in Figure 2 and the waveform shown in Figure 3. The waveform shown in Figure 4 exhibits sudden changes in magnitude each time the switch 3 is operated when the portions 9 are present. This waveform is smoothed by the condenser 13 and resistance 14 and appears across the condenser 13 in the form shown in Figure 5. This waveform is approximately sinusoidal and is practically of the same amplitude as the interference appearing in the waveform shown in Figure 2 and is of opposite phase but delayed by half the synchronising pulse period T plus the smoothing time constant of the condenser 13 and the resistance 14. Thus there appears at the output terminals 15 the waveform shown in Figure 6 from which it will be observed that the interference is substantially cancelled leaving a comparatively smooth residue due to the aforesaid delay and hence proportional approximately to the frequency of the interference. If the time constant of the condenser 13 and the resistance 14 is made equal to one-half the pulse period T the attenuation factor is the same as that referred to above, but does not vary appreciably throughout each line of picture signals—i. e. the slope of the portions 10 is much less than in Figure 3.

Since the residue of interference as shown in Figure 6 is smooth and has a similar character to the original interference, but of reduced amplitude, the output from the terminals 15 can be fed into a further circuit similar to that shown in Figure 1 or to a further clamp D. C. re-inserting circuit so as to effect further attenuation of the interfering signal.

If desired, a low-pass filter may be arranged in series with the switch 3, the filter having a cutoff frequency of the order of a few times the reciprocal of the duration of each clamping pulse 7. The purpose of such filter is to reduce any disturbing effect of high-frequency noise components which may be present in the signals shown in Figure 2 including the signal portions 9. Such filter may comprise merely a resistance 16 and a condenser 17 which is connected between the junction of the resistance 16 and the switch 3 and earth.

Figure 7 illustrates the bidirectionally conducting switch shown in Figure 4 of United States Patent No. 2,190,752 as applied to a circuit in accordance with the invention. In Figure 7, components which correspond to components shown in Figure 4 of said patent are given the same reference numerals and those which correspond to those shown in Figure 1 of the present application are likewise given the same reference numerals. The operation of the circuit shown in Figure 7 will be readily appreciated from a reading of a description of Figure 4 of said United States patent.

The present invention can also be employed in connection with D. C. re-inserting circuits which employ a rectifier which rectifies datum level signals and in such case it is preferred to employ in conjunction with such rectifier the subject matter of British Patent No. 616,984.

What I claim is:

1. A circuit for setting the level of electric signals which contain recurrent datum signals which should have a fixed level, comprising a source of signals, a condenser, level setting means in series with said condenser to fix the level of said datum signals, said condenser and level setting means being connected in shunt across said source of said signals, and a smoothing circuit comprising a further condenser connected between said source and said first-mentioned condenser and having a magnitude small compared with that of said first-mentioned condenser in series with a resistance and connected across said first-mentioned condenser, said smoothing circuit having a time constant approximately equal to the time between successive datum signals thereby reducing at the junction between said further condenser and said resistance variations in level which tend to arise between successive datum signals due to superimposed spurious signals.

2. A circuit for setting the level of electric signals which contain recurrent datum portions which should have a fixed level, comprising a source of signals, a condenser, level setting means in series with said condenser, said level setting means including a switch and a source of potential, a source of pulses having a frequency and polarity to operate said switch at instants when said datum signals are present, said condenser and level setting means being connected in shunt across said source of said signals, and a smoothing circuit comprising a further condenser connected between said source and said first-mentioned condenser and, having a magnitude small compared with that of said first-mentioned condenser, in series with a resistance and connected across said first-mentioned condenser, said smoothing circuit having a time constant approximately equal to the time between successive datum signals thereby reducing at the junction between said further condenser and said resistance variations in level which tend to arise between successive datum signals due to super-imposed spurious signals.

3. Television apparatus for setting the level of recurrent datum signals present during each line of television signals and which should have a fixed level comprising a source of said signals, including a condenser, level setting means in series with said condenser, said level setting means including a switch and a source of potential, a source of pulses having a frequency and polarity to operate said switch at instants when said datum signals are present, said condenser and level setting means being connected in shunt across said source of signals, and a smoothing circuit comprising a further condenser, having a magnitude small compared with that of said first-mentioned condenser connected between said source and said first-mentioned condenser and in series with a resistance and connected across said first-mentioned condenser, said smoothing circuit having a time constant approximately equal to the duration of each line of said television signals, thereby reducing at the junction between said further condenser and said resistance variations in level which tend to arise in the television signals between successive datum signals due to superimposed spurious signals.

References Cited in the file of this patent

UNITED STATES PATENTS

| | | |
|---|---|---|
| 2,178,736 | Campbell | Nov. 7, 1939 |
| 2,240,281 | Ballard | Apr. 29, 1941 |
| 2,463,735 | Bedford | Mar. 8, 1949 |
| 2,651,675 | Wissell | Sept. 8, 1953 |
| 2,675,423 | Kirkness | Apr. 13, 1954 |

FOREIGN PATENTS

| | | |
|---|---|---|
| 468,905 | Great Britain | July 15, 1937 |